United States Patent
Lisewski et al.

(10) Patent No.: US 12,088,548 B2
(45) Date of Patent: Sep. 10, 2024

(54) SYSTEMS AND METHODS FOR EDGE DEVICE DISCOVERY

(71) Applicant: Verizon Patent and Licensing Inc., Basking Ridge, NJ (US)

(72) Inventors: Kevin Lisewski, Ponte Vedra, FL (US); Ning Zhang, Warren, NJ (US); Ravi Sharma, Freehold, NJ (US); Wujun Qie, Needham, MA (US); Ramanathan Subramaniam, Old Bridge, NJ (US); Raghuram Parvataneni, Plano, TX (US); Mahesh Chapalamadugu, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/057,077

(22) Filed: Nov. 18, 2022

(65) Prior Publication Data
US 2024/0171540 A1    May 23, 2024

(51) Int. Cl.
*H04L 61/4511* (2022.01)
*H04W 8/26* (2009.01)
*H04W 60/00* (2009.01)

(52) U.S. Cl.
CPC ......... *H04L 61/4511* (2022.05); *H04W 8/26* (2013.01); *H04W 60/00* (2013.01)

(58) Field of Classification Search
CPC ...... H04L 61/4511; H04W 8/26; H04W 60/00
See application file for complete search history.

(56) References Cited

U.S. PATENT DOCUMENTS

| | | | | |
|---|---|---|---|---|
| 2020/0169856 | A1* | 5/2020 | Yang | H04L 67/1008 |
| 2020/0274777 | A1* | 8/2020 | Liu | H04L 43/20 |
| 2020/0359218 | A1* | 11/2020 | Lee | H04M 15/50 |
| 2021/0055959 | A1* | 2/2021 | Rehman | G06F 9/4881 |
| 2021/0105659 | A1* | 4/2021 | Li | H04L 47/283 |
| 2022/0182441 | A1* | 6/2022 | Bernat | H04L 67/51 |
| 2022/0191090 | A1* | 6/2022 | Lee | H04L 67/535 |
| 2022/0191776 | A1* | 6/2022 | Kim | H04W 12/06 |
| 2022/0264335 | A1* | 8/2022 | Ramamurthi | H04L 43/0852 |
| 2022/0329499 | A1* | 10/2022 | Smith | H04L 41/5006 |
| 2022/0345410 | A1* | 10/2022 | Carames | H04L 45/745 |
| 2022/0345442 | A1* | 10/2022 | Lee | H04L 61/4511 |
| 2022/0394088 | A1* | 12/2022 | Salkintzis | H04L 61/4511 |
| 2023/0013720 | A1* | 1/2023 | Gupta | H04W 12/08 |
| 2023/0034349 | A1* | 2/2023 | Mladin | H04W 4/40 |

* cited by examiner

*Primary Examiner* — Jimmy H Tran (57) ABSTRACT

A system may receive registration information regarding a user equipment (UE). The system may determine a UE usage type for the UE from a plurality of UE usage types. The plurality of UE usage types includes a first UE usage type associated with accessing first services using a cloud domain name system (DNS) and a second UE usage type associated with accessing second services using an edge DNS. The system may receive a notification indicating that the UE is requesting access to a service and identify an edge device for providing access to the service. The system may obtain information identifying the UE usage type of the UE based on UE identification information of the UE. The system may provide, to the UE, DNS information regarding using the cloud DNS or the edge DNS to obtain a network address of the edge device.

20 Claims, 8 Drawing Sheets

SYSTEMS AND METHODS FOR EDGE DEVICE DISCOVERY

BACKGROUND

Multi-access edge computing (MEC), also known as mobile edge computing, is a network architecture that enables cloud computing capabilities and an information technology service environment at an edge of a network, such as a cellular network. MEC enables execution of applications and performance of related processing tasks closer to a network customer, which may reduce network congestion and improve application performance. MEC technology may be implemented at central offices, metro locations, base stations or other radio access network (RAN) edge devices, and may enable flexible and rapid deployment of new applications and services for customers.

DETAILED DESCRIPTION OF PREFERRED EMBODIMENTS

The following detailed description of example implementations refers to the accompanying drawings. The same reference numbers in different drawings may identify the same or similar elements.

A user equipment (UE) may access a multi-access edge computing (MEC) service using an MEC device. Typically, the UE must provide information regarding a location of the UE to enable an edge discovery service component to perform a discovery process to identify an optimal MEC device for the UE. For example, the UE may authenticate with the edge discovery service component. The edge discovery service component may provide a request for an Internet Protocol (IP) address of the UE. The UE may provide the IP address to enable the edge discovery service component to identify the MEC device associated with a location indicated by the IP address.

Providing the IP address in this manner consumes computing resources of the UE. Additionally, providing and processing the request for the IP address consumes computing resources of the network. Furthermore, providing and processing the request for the IP address increases a measure of latency experienced by the device.

Once the MEC device is identified, the UE may use an edge domain name system (DNS) to obtain a network address of the MEC device if the MEC device is included in an edge network (e.g., a near edge network). The edge DNS may be included in the edge network. Alternatively to using the edge DNS, the UE may use a cloud DNS to obtain the network address of the MEC device if the MEC device is included in a far cloud network (e.g., a far edge network). The cloud DNS may be included in the far cloud network.

Typically, the UE has to be configured in a first manner if the MEC service is to be provided from the edge network. Alternatively, the UE has to be configured in a second manner if the MEC service is to be provided from the far cloud network. Accordingly, the UE may be configured and reconfigured multiple times based on a location of the MEC device. Configuring and reconfiguring the UE in this manner is cumbersome and consumes computing resources and/or network resources.

Implementations described herein are directed to identifying an edge device without requiring a UE to provide information identifying the location of the UE. The edge device may be identified to provide a service requested by the UE. As an example, when the UE connects to a network, one or more network components (or entities) of the network may assign an IP address to the UE. The assigned IP address may be provided to a far cloud component. The far cloud component may use the assigned IP address (which indicates the location of the UE) to identify an optimal edge device for the UE. For example, the assigned IP address may be used to identify an edge device that is optimal with respect to the location of the UE.

By identifying the edge device in this manner, implementations described herein prevent latency associated with querying the UE for information regarding the location of the UE. Additionally, by identifying the edge device in this manner, implementations described herein preserve computing resources that would have been consumed to request and process the information regarding the location of the UE.

Furthermore, implementations described herein are directed to determining an identifier for the UE. The identifier may be referred to as a "UE usage type." In some instances, the UE usage type may be included in a profile of the UE. In some examples, the profile may further include information regarding the services that the UE is entitled to access.

In some examples, the UE usage type may be determined based on services that the UE is entitled (or authorized) to access. The services may be services that are to be accessed via edge devices in the edge network (e.g., services associated with low latency). Alternatively, the services may be services that may be accessed via edge devices in the far cloud network.

In this regard, the UE usage type may indicate whether the UE is to use a cloud DNS or an edge DNS to obtain a network address of the edge device identified for the UE. The UE usage type may be selected from a plurality of UE usage types. For example, the UE usage type may be a first UE usage type indicating that the UE is to use the cloud DNS. Alternatively, the UE usage type may be a second UE usage type indicating that the UE is to use the edge DNS.

Based on the foregoing, the UE usage type may prevent the UE from being configured and reconfigured multiple times based on whether a service is to be accessed from the edge network or from the far cloud network. Accordingly, implementations described may preserve computing resources and network resources that would have been used to configure and reconfigure the UE multiples. In some examples, the UE usage type may be a third UE usage type indicating that the UE may use the cloud DNS or the edge DNS. The third UE usage type may be determined for the UE based on the UE being entitled to access services from the edge network and access services from the far cloud network.

FIGS. 1A-1E are diagrams of an example 100 associated with edge device discovery. As shown in FIGS. 1A-1E, example 100 includes a UE 105, a far cloud component 110, an edge discovery service (EDS) component 115, a software device manager (SDM) component 120, a mobile management entity (MME) component 125, and an edge instance 130. In some examples, far cloud component 110 may be included in a far cloud network (e.g., a far edge network). SDM component 120 and MME component 125 may be included in a core network. UE 105 may connect to the core network. EDS component 115 and edge instance 130 may be included in an edge network (e.g., a near edge network).

UE 105 may include one or more devices capable of receiving, generating, storing, processing, and/or providing information associated with edge device discovery, as described elsewhere herein. For example, UE 105 may provide a request for a service to cause an edge device discovery process to be performed (to identify an edge device associated with the service). UE 105 may include a communication device and a computing device. For example, UE 105 may include a wireless communication device, a mobile phone, or a similar type of device.

Far cloud component 110 may include one or more devices capable of receiving, generating, storing, processing, and/or providing information associated with edge device discovery, as described elsewhere herein. For example, far cloud component 110 may cause an edge device discovery process to be performed, as described elsewhere herein. Additionally, or alternatively, far cloud component 110 may configure (or determine) UE usage types for one or more UEs, as described elsewhere herein. Additionally, or alternatively, far cloud component 110 may store information regarding services and/or applications that the one or more UEs are entitled (or authorized) to access. In some implementations, far cloud component 110 may host the applications.

EDS component 115 may include one or more devices capable of receiving, generating, storing, processing, and/or providing information associated with edge device discovery, as described elsewhere herein. For example, EDS component 115 may be configured to perform an edge device discovery process to identify one or more edge devices that provide one or more services requested by UE 105. For instance, EDS component 115 may identify the one or more edge devices based on information regarding a location and/or a region of UE 105.

SDM component 120 may include one or more devices capable of receiving, generating, storing, processing, and/or providing information associated with a plurality of UEs. For example, SDM component 120 may include a data structure that stores profiles of the plurality of UEs. In some example, the profile of a particular UE may include UE identification information of the particular UE and information regarding a particular UE usage type of the particular UE. The UE identification information may include a serial number, an international mobile equipment identity (IMEI), a mobile directory number (MDN), among other examples of information that uniquely identifies the particular UE.

The information regarding the particular UE usage type may include information identifying the particular UE usage type and information identifying a DNS to be used by the particular UE. As an example, if the particular UE usage type is the first usage type, the information identifying the DNS may indicate that the particular UE is to use the cloud DNS to obtain a network address of an edge device. Alternatively, if the particular UE usage type is the second usage type, the information identifying the DNS may indicate that the particular UE is to use the edge DNS to obtain the network address. The information identifying the particular UE usage type may be an element of the profile.

MME component 125 includes one or more devices, such as one or more server devices, capable of managing authentication, activation, deactivation, and/or mobility functions associated with UE 105. Edge instance 130 may include an edge device. As an example, edge instance 130 may be an MEC device. In some instances, edge instance 130 may be included in the far cloud network. Alternatively, edge instance 130 may be included in the edge network.

Figure 1A:
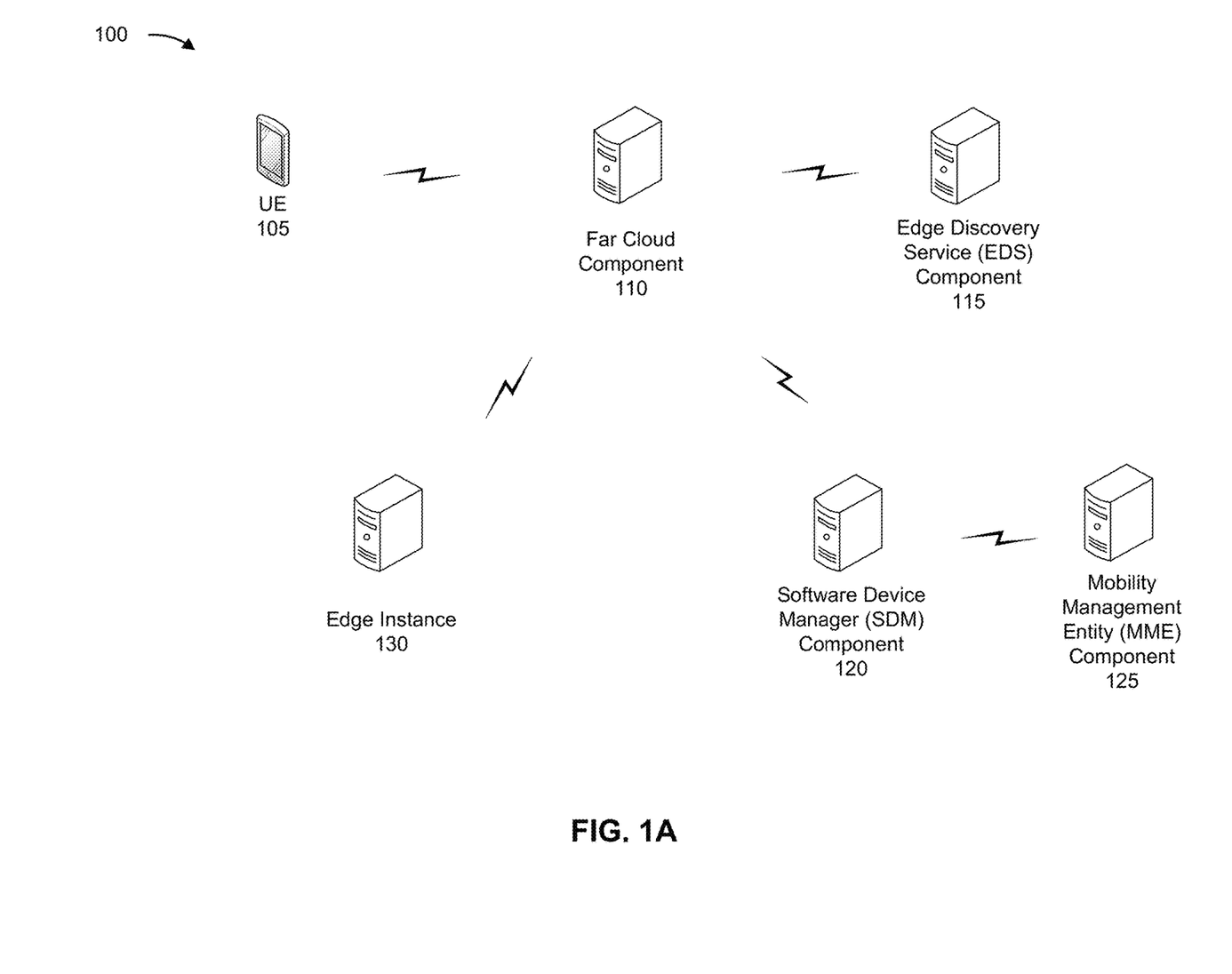
FIGS. 1A-1E are diagrams of an example associated with edge device discovery.
Figure 1B:
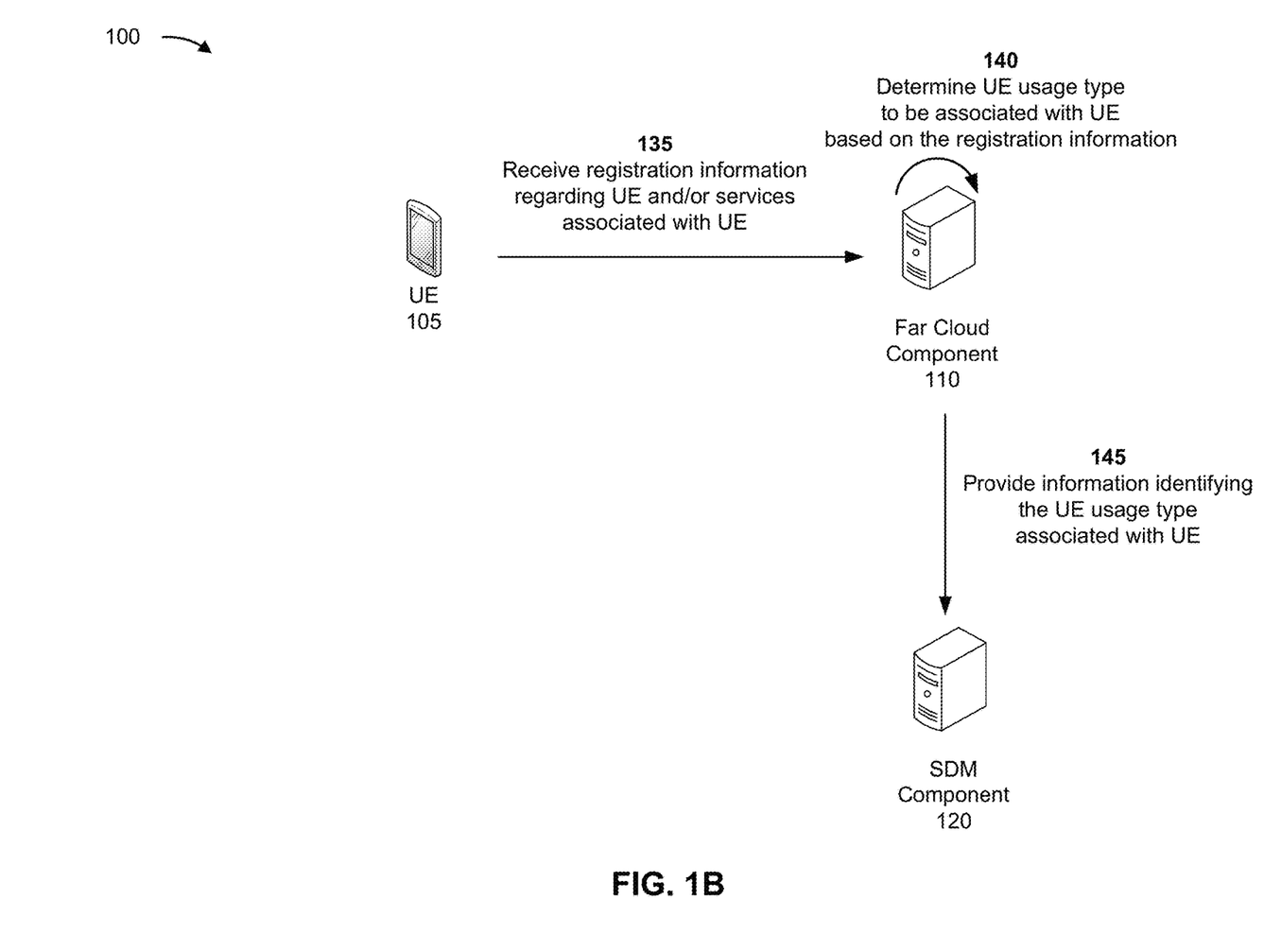

As shown in FIG. 1B, and by reference number 135, far cloud component 110 may receive registration information regarding UE 105. In some examples, the registration information may be received as part of a process to register UE 105 to enable UE 105 to access services. For example, a user associated with UE 105 may desire to establish a subscription to the services. In this regard, the user may provide the registration information to identify the services and/or applications that may be accessed by UE 105 and to indicate a measure of latency associated with each of the services and/or applications. In some examples, the user may provide the registration information to far cloud component 110 using UE 105. Additionally, or alternatively, the user may provide the registration information to far cloud component 110 using another device.

The registration information may identify UE 105, may identify the services and/or applications, and/or may identify the measure of latency associated with each of the services (and applications). As an example, the registration information may include UE identification information of UE 105. Additionally, the registration information may identify types of the services, types of the applications, names of the services, and/or names of the applications. As an example, the registration information may identify a gaming service, a gaming application, a vehicle-to-vehicle application, an augmented reality (AR) service, an AR application, a virtual reality (VR) service, a VR application, among other examples.

In some examples, the registration information may include entitlement information identifying the subscription of services that UE 105 is entitled (or authorized) to access. The registration information may indicate whether the services are to be accessed using one or more devices in the edge network and/or using one or more devices in the far cloud network. In other words, the entitlement information may indicate whether the subscription for premium entitlement (or premium services), for basic entitlement (or basic services), or for hybrid entitlement (or hybrid services).

The premium entitlement may indicate that all services are to be accessed via the one or more devices included in the edge network. The basic entitlement may indicate that all services are to be accessed via the one or more devices included in the far cloud network. In this regard, a measure of latency associated with the basic entitlement may exceed a measure of latency associated with the premium entitlement. The hybrid entitlement may indicate that one or more services are to be accessed via the one or more devices included in the edge network and that one or more services may be accessed via the one or more devices included in the far cloud network.

Far cloud component 110 may store the registration information in a data structure (e.g., a database, a table, and/or a linked list). For example, the data structure may store the UE identification information in association with the entitlement information. Additionally, the data structure may store the UE identification information in association with domain names associated with the services and/or applications. In some instances, the registration information may include credentials associated with the user (e.g., username, password, authentication code, among other examples).

In some implementations, far cloud component 110 may cause a notification to be provided to UE 105. The notification may indicate that UE 105 is entitled to access the services. Additionally, the notification may identify domain names associated with the services.

As shown in FIG. 1B, and by reference number 140, far cloud component 110 may determine the UE usage type to be associated with UE 105 based on the registration information. The UE usage type may identify a DNS that UE 105 is to use to obtain a network address of an edge device. The identified DNS may be used to obtain a network address that is used to access the services identified in the registration information. The UE usage type may be selected from a plurality of UE usage types. The plurality of UE usage types may include the first UE usage type indicating that UE 105 is to use the cloud DNS. The plurality of UE usage types may further include the second UE usage type indicating that UE 105 is to use the edge DNS. The plurality of UE usage types may additionally include the third UE usage type indicating that the UE may use the cloud DNS or the edge DNS.

In some implementations, far cloud component 110 may determine the UE usage type based on the entitlement information. For example, far cloud component 110 may determine that the UE usage type is the first UE usage type based on the entitlement information identifying the basic entitlement. Alternatively, far cloud component 110 may determine that the UE usage type is the second UE usage type based on the entitlement information identifying the premium entitlement. Alternatively, far cloud component 110 may determine that the UE usage type is the third UE usage type based on the entitlement information identifying the hybrid entitlement.

In some implementations, far cloud component 110 may determine the UE usage type based on a type of a service, a name of a service, a type of an application, and/or a name of the application. For example, far cloud component 110 may determine a measure of latency associated with a type of service based on historical data regarding latency associated with the type of service. Additionally, or alternatively, far cloud component 110 may determine a measure of latency associated with a name of a service based on historical data regarding latency associated with the name of the service. Additionally, or alternatively, far cloud component 110 may determine a measure of latency associated with a type of application based on historical data regarding latency associated with the type of application. Additionally, or alternatively, far cloud component 110 may determine a measure of latency associated with a name of an application based on historical data regarding latency associated with the name of the application.

Based on the measure of latency, far cloud component 110 may determine the UE usage type. For example, far cloud component 110 may determine that the UE usage type is the first UE usage type based on the measure of latency satisfying a latency threshold. Alternatively, far cloud component 110 may determine that the UE usage type is the second UE usage type based on the measure of latency not satisfying the latency threshold. For instance, far cloud component 110 may determine that the measure of latency of a vehicle-to-vehicle application does not satisfy the latency threshold (e.g., based on historical data regarding the vehicle-to-vehicle application). Alternatively, far cloud component 110 may determine that the measure of latency of a particular type of gaming application satisfies the latency threshold (e.g., based on historical data regarding the particular type of gaming application).

As shown in FIG. 1B, and by reference number 145, far cloud component 110 may provide information identifying the UE usage type associated with UE 105. For example, far cloud component 110 may provide the information identifying the UE usage type and the UE identification information of UE 105 to SDM component 120. SDM component 120 may store the information identifying the UE usage type in association with the UE identification information in the data structure. As an example, SDM component 120 may include the information identifying the UE usage type and the UE identification information in a profile of UE 105. The profile may include information regarding the UE usage type which may include the information identifying the UE usage type and information indicating a DNS to be used by UE 105 based on the UE usage type.

Figure 1C:
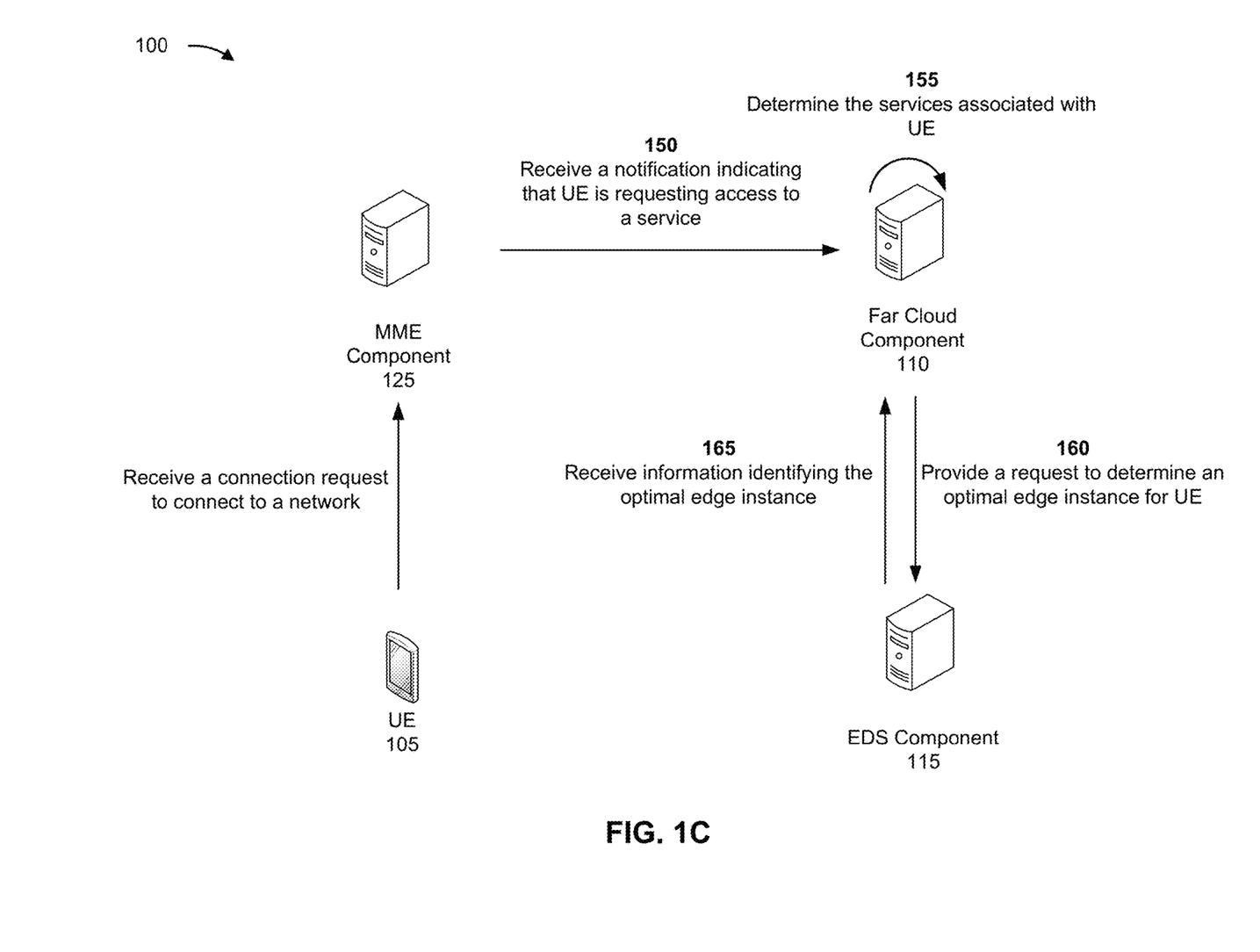

As shown in FIG. 1C, MME component 125 may receive a connection request to connect a network (e.g., a request to attach to the core network). MME component 125 may receive the connection request from UE 105. In some examples, UE 105 may provide the connection request for the purpose of accessing a service included in the subscription of services of UE 105. The connection request may include the UE identification information of UE 105, the credentials of the user associated with UE 105, information identifying the service, among other examples. The information identifying the service may include a name of the service, a domain name of the service, and/or a type of the service, among other examples.

In some implementations, MME component 125 may process the connection request by performing operations relating to authentication of UE 105. Based on authenticating UE 105, MME component 125 may provide a notification regarding the connection request to a service capability exposure function (SCEF). In some examples, MME component 125, the SCEF, and/or other components of the core network may assign a network address to UE 105. The network address may include an IP address.

As shown in FIG. 1C, and by reference number 150, far cloud component 110 may receive a notification indicating that UE 105 is requesting access to the service. For example, the SCEF may provide the notification after the network address has been assigned to UE 105. The notification may include the UE identification information, the information identifying the service, and/or the credentials associated with UE 105. In some examples, the SCEF may provide the notification to cause far cloud component 110 to determine whether UE 105 is authorized to access the service.

As shown in FIG. 1C, and by reference number 155, far cloud component 110 may determine the services associated with UE 105. In some examples, far cloud component 110 may authenticate UE 105 by comparing the credentials included in the notification and the credentials of UE 105 stored in the data structure. Based on authenticating UE 105, far cloud component 110 may determine the subscription of services associated with UE 105. For example, far cloud component 110 may determine the subscription of services associated with UE 105 using the UE identification information. For example, far cloud component 110 may perform a lookup of the data structure using the UE identification information and obtain information identifying the subscription of services from the data structure. The information identifying the subscription of services may identify the service (e.g., include the information identifying the service). Accordingly, far cloud component 110 may determine that UE 105 is authorized to access the service.

As shown in FIG. 1C, and by reference number 160, far cloud component 110 may provide a request to determine an optimal edge instance for UE. For example, after determining that UE 105 is authorized to access the service, far cloud component 110 may provide a request that includes the network address assigned to UE 105. Far cloud component 110 may provide the request to EDS component 115 to cause EDS component 115 to identify an optimal edge instance based on the network address assigned to UE 105 and to provide information identifying the optimal edge instance. The network address assigned to UE 105 may be used to determine a location and/or a region of UE 105. Accordingly, based on the request, EDS component 115 may identify an edge instance that is associated with the location and/or the region of UE 105 determined using the network address. In other words, EDS component 115 may identify an edge instance that is optimal with respect to the location and/or the region of UE 105.

As shown in FIG. 1C, and by reference number 165, far cloud component 110 may receive information identifying the optimal edge instance. For example, EDS component 115 may identify the optimal edge instance associated with the network address and may provide the information identifying the optimal edge instance to far cloud component 110. As an example, the information identifying the optimal edge instance may identify edge instance 130. The information may identify a network address of edge instance 130 (e.g., an IP address of edge instance 130).

By identifying edge instance 130 independently of querying the UE as described herein, implementations described herein prevent latency associated with querying UE 105 for information regarding the location and/or the region of UE. Additionally, by identifying edge instance 130 as described herein, implementations described herein preserve computing resources that would have been consumed to request and process the information regarding the location of the UE.

Figure 1D:
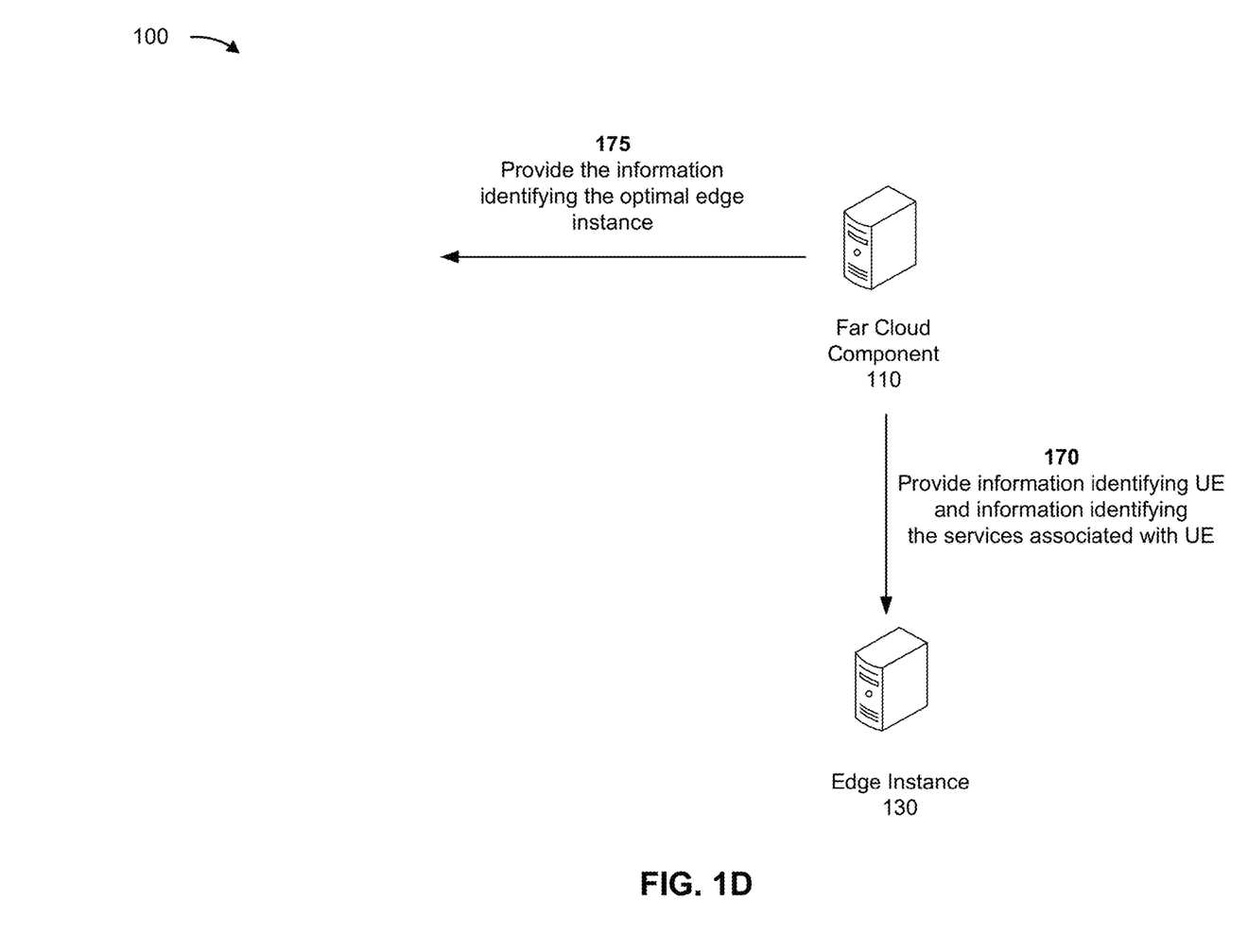

As shown in FIG. 1D, and by reference number 170, far cloud component 110 may provide information identifying UE 105 and information identifying the services associated with UE 105. For example, far cloud component 110 may provide the UE identification information of UE 105, the credentials, and the information regarding the subscription of services associated with UE 105 to edge instance 130. Far cloud component 110 may provide an application (associated with the service) to edge instance 130. Far cloud component 110 may provide the information discussed above to edge instance 130 using the network address of edge instance 130.

As shown in FIG. 1D, and by reference number 175, far cloud component 110 may provide the information identifying the optimal edge instance. For example, far cloud component 110 may provide the network address of edge instance 130 and/or the domain name associated with the service to the edge DNS. In this regard, an entry may be created in the edge DNS for the network address of edge instance 130. The entry may include the network address of edge instance 130 in association with the domain name.

Figure 1E:
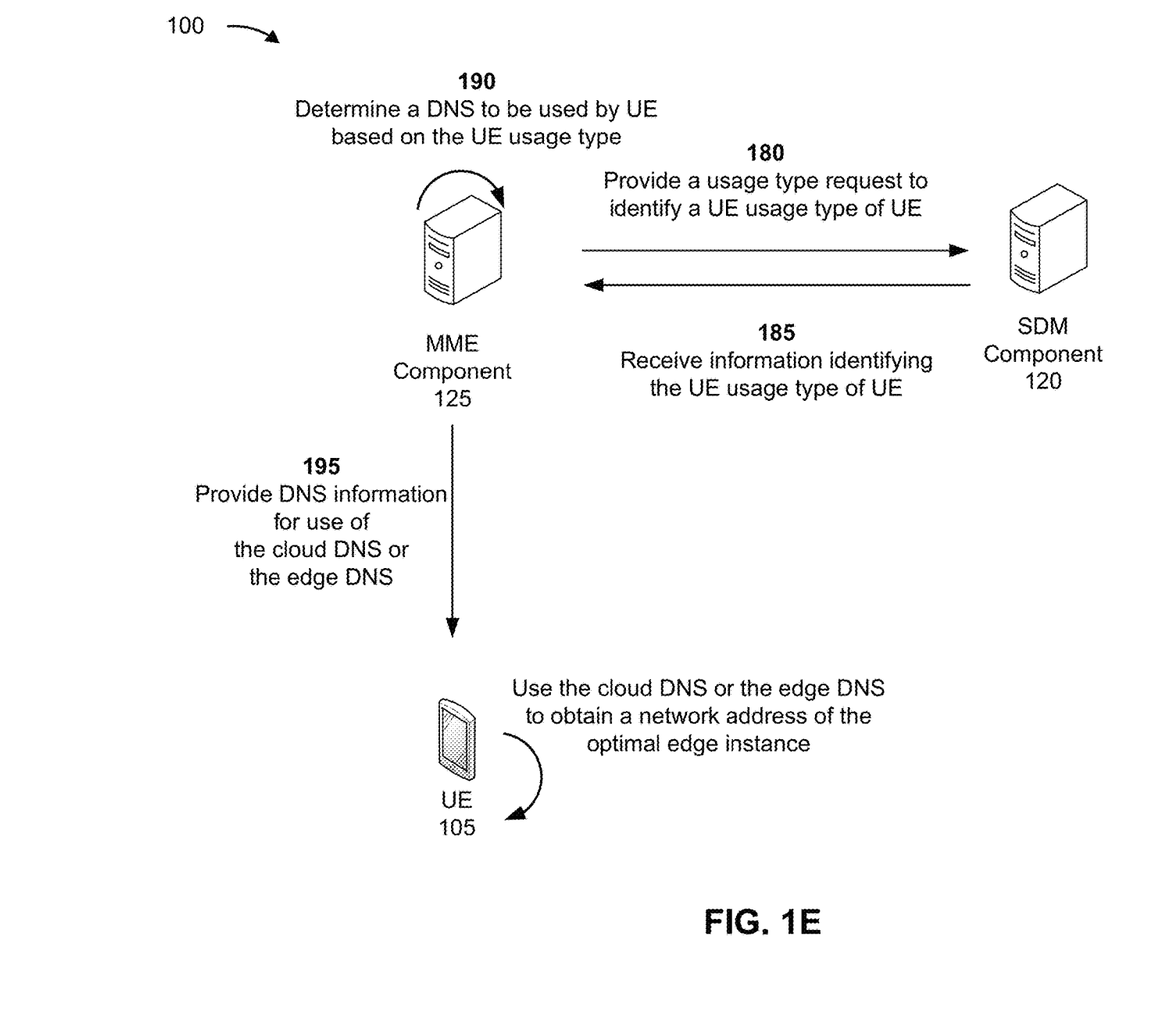

As shown in FIG. 1E, and by reference number 180, MME component 125 may provide a usage type request to identify the UE usage type of UE 105. For example, based on receiving the connection request from UE 105, MME component 125 may determine that the UE usage type of UE 105 is to be identified. Accordingly, MME component 125 may provide the usage type request to SDM component 120. The usage type request may include the UE identification information (included in the connection request).

Based on receiving the usage type request, SDM component 120 may identify the UE usage type of UE 105. For example, SDM component 120 may identify the UE usage type of UE 105 using the UE identification request of UE 105. For instance, SDM component 120 may perform a lookup of the data structure of SDM component 120 to identify the UE usage type associated with the UE identification information.

As shown in FIG. 1E, and by reference number 185, MME component 125 may receive information identifying the UE usage type of UE 105. For example, after the UE usage type of UE 105, SDM component 120 may provide information regarding the UE usage type. The information regarding the UE usage type may include information identifying the UE usage type and information indicating a DNS to be used by UE 105 (e.g., to obtain a network address that will be used to access the service via edge instance 130).

As shown in FIG. 1E, and by reference number 190, MME component 125 may determine a DNS to be used by UE 105 based on the UE usage type. For example, based on the information regarding the UE usage type, MME component 125 may determine whether UE 105 is to use the cloud DNS for all services included in the subscription of services, use the edge DNS for all services included in the subscription of services, or use the cloud DNS for a first portion of the services and use the edge DNS for a second portion of the services.

As shown in FIG. 1E, and by reference number 195, MME component 125 may provide DNS information for use of the cloud DNS or the edge DNS. For example, MME component 125 may provide the DNS information to UE 105. The DNS information may cause UE 105 to obtain the network address of edge instance 130 using the cloud DNS or the edge DNS. For example, the DNS information may cause UE 105 to obtain the network address of edge instance 130 using the cloud DNS if the UE usage type is the first UE usage type or using the edge DNS if the UE usage type is the second UE usage type.

Alternatively, the DNS information may cause UE 105 to obtain the network address of edge instance 130 using the cloud DNS or the edge DNS if the UE usage type is the third UE usage type. For example, UE 105 may use the cloud DNS if the measure of latency associated with the service satisfies the latency threshold. Alternatively, UE 105 may use the edge DNS if the measure of latency does not satisfy the latency threshold.

As shown in FIG. 1E, UE 105 may use the cloud DNS or the edge DNS to obtain the network address of the optimal edge instance (e.g., edge instance 130). For example, when using the cloud DNS, UE 105 may provide a request for the network address of edge instance 130 to the cloud DNS. The request may include the domain name associated with the service. Based on receiving the request, the cloud DNS may locate the network address (e.g., IP address) associated with the domain name. The cloud DNS may provide the network address to UE 105. UE 105 may use the network address to access the service.

Similarly, when using the edge DNS, UE 105 may provide a request for the network address of edge instance 130 to the edge DNS. The request may include the domain name associated with edge instance 130. Based on receiving the request, the edge DNS may locate the network address (e.g., IP address) associated with the domain name. The edge DNS may provide the network address to UE 105. UE 105 may use the network address to access the service.

In some instances, the edge DNS may not locate the domain name. In this regard, the edge DNS may determine that UE 105 is not provisioned to be served by edge instance 130. Accordingly, the edge DNS may redirect the request from UE 105 to the cloud DNS.

By identifying edge instance 130 as described herein, implementations described herein prevent latency associated with querying UE 105 for information regarding the location and/or the region of UE. Additionally, by identifying edge instance 130 as described herein, implementations described herein preserve computing resources that would have been consumed to request and process the information regarding the location of the UE.

Moreover, as described herein, the UE usage type may prevent UE 105 from being configured and reconfigured multiple times based on whether a service is to be accessed from the edge network or from the far cloud network. Accordingly, implementations described may preserve computing resources and network resources that would have been used to configure and reconfigure the UE multiples.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
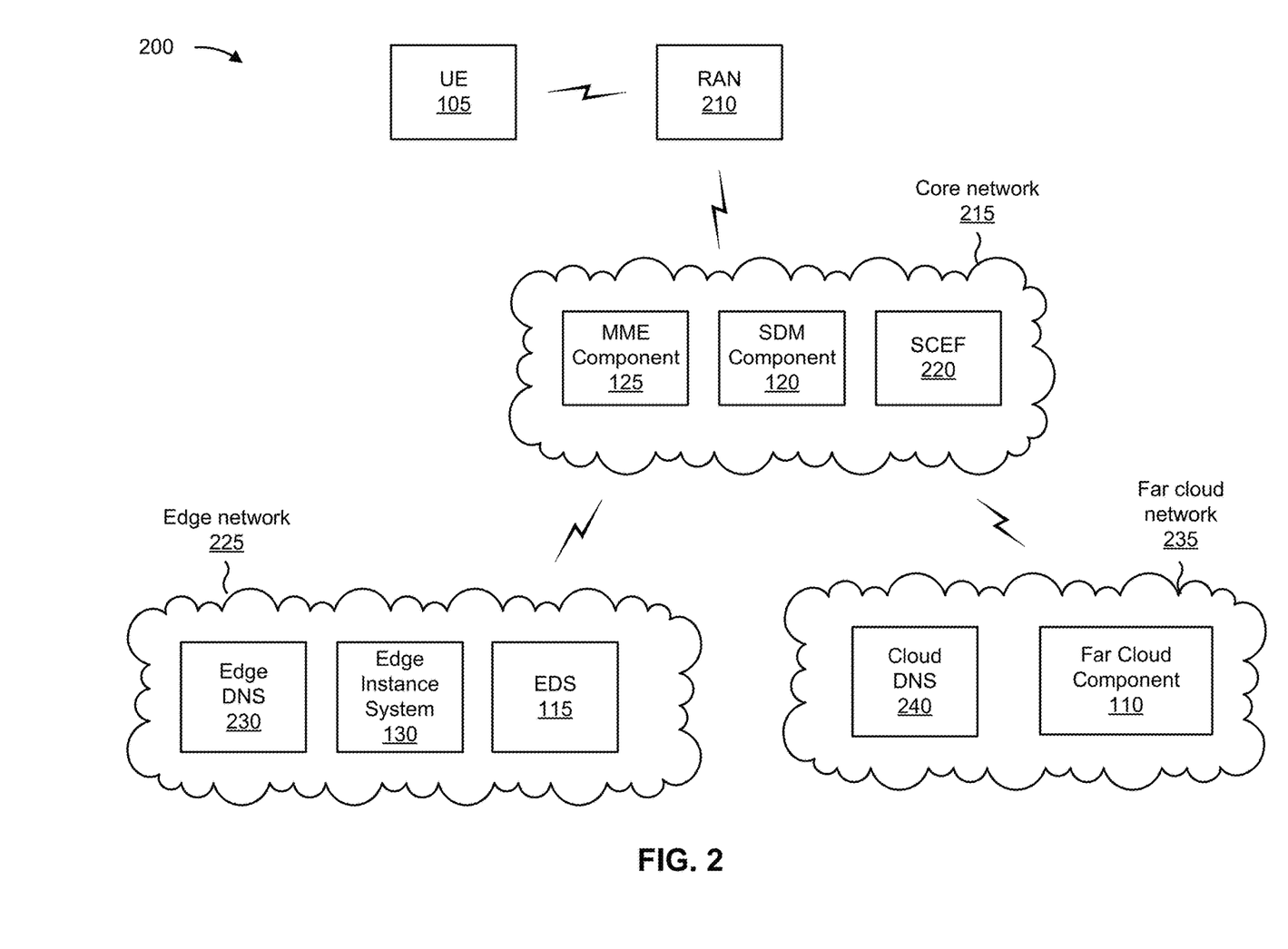
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include UE 105, far cloud component 110, EDS component 115, SDM component 120, MME component 125, and/or edge instance 130. In some implementations, UE 105, far cloud component 110, EDS component 115, SDM component 120, MME component 125, edge instance 130, a radio access network (RAN) 210, an SCEF 220, an edge DNS 230, and a cloud DNS 240. Some of the elements of FIG. 2 have been discussed above in connection with FIG. 1.

Devices of environment 200 may interconnect via wired connections, wireless connections, or a combination of wired and wireless connections. Some implementations are described herein may be performed within a long-term evolution (LTE) network and/or within a fifth generation (5G) network, among other examples.

As shown in FIG. 2, SDM component 120, MME component 125, and SCEF 220 may be included in a core network 215. Edge DNS 230, edge instance 130, and EDS component 115 may be included in an edge network 225. Edge network 225 may be a near edge network. Edge DNS 230 may include a DNS that is provided in a near edge network. Far cloud component 110 and cloud DNS 240 may be included in a far cloud network 235. Far cloud network 235 may be a far edge network. Cloud DNS 240 may include a DNS that is provided in a far edge network.

UE 105 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. As shown in FIG. 2, UE 105 may establish a connection with core network 215 via RAN 210.

RAN 210 may support, for example, a cellular radio access technology (RAT). RAN 210 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 105.

MME component 125 includes one or more devices, such as one or more server devices, capable of managing authentication, activation, deactivation, and/or mobility functions associated with UE 105. In some implementations, MME component 125 may perform operations relating to authentication of UE 105. Additionally, or alternatively, MME component 125 may facilitate the selection of a serving gateway (SGW) and/or a packet data network gateway to provide traffic to and/or from UE 105. In some examples, MME component 125 may provide the traffic from UE 105 via SCEF 220.

SCEF 220 may include a gateway interface that securely exposes and/or discovers services and capabilities provided by other network interfaces. SCEF 220 may perform one or more actions performed by a network exposure function (NEF) and/or a network repository function (NRF).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
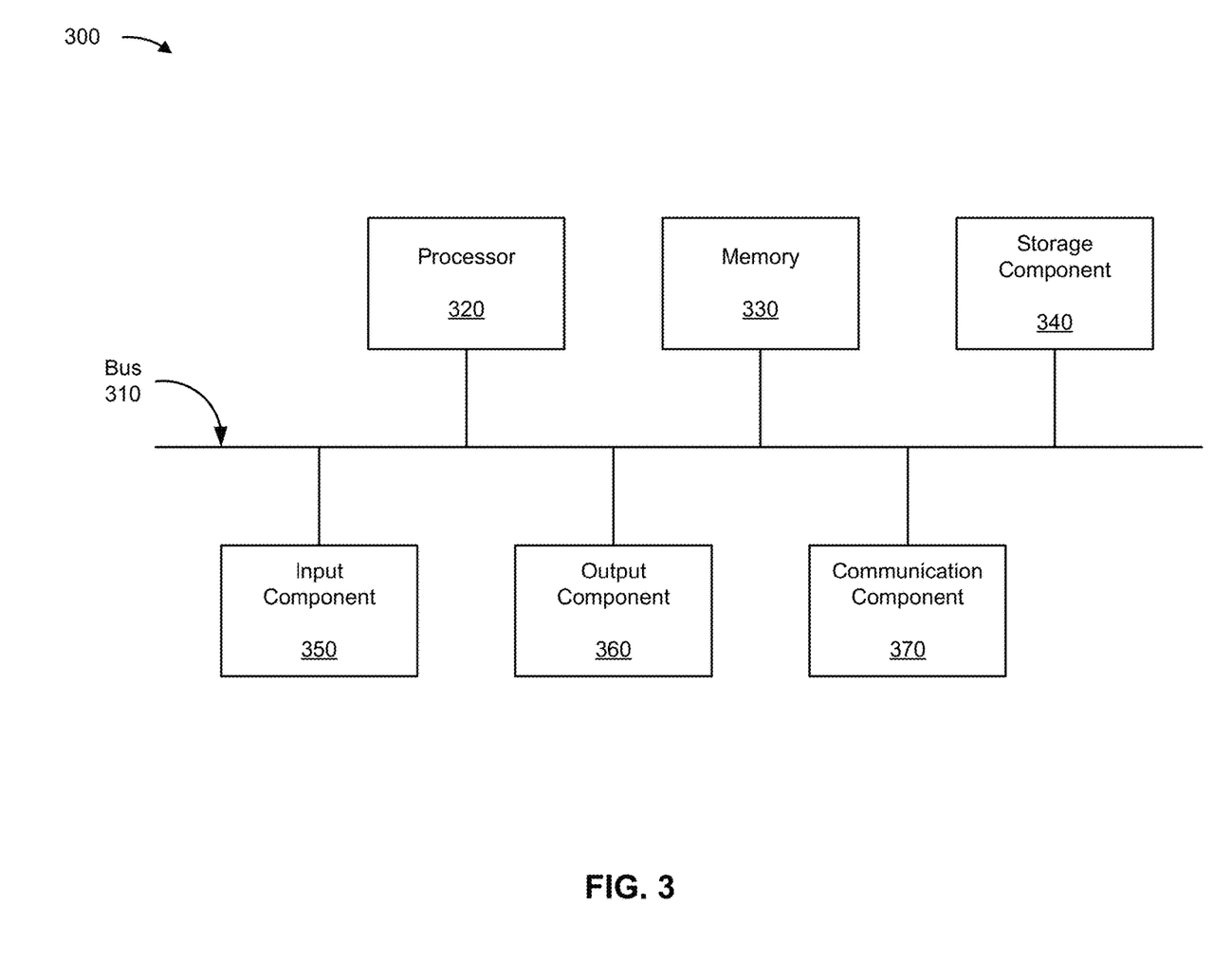
FIG. 3 is a diagram of example components of one or more devices of FIG. 2.

FIG. 3 is a diagram of example components of a device 300, which may correspond to UE 105, far cloud component 110, EDS component 115, SDM component 120, MME component 125, and/or edge instance 130. In some implementations, UE 105, far cloud component 110, EDS component 115, SDM component 120, MME component 125, and/or edge instance 130 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
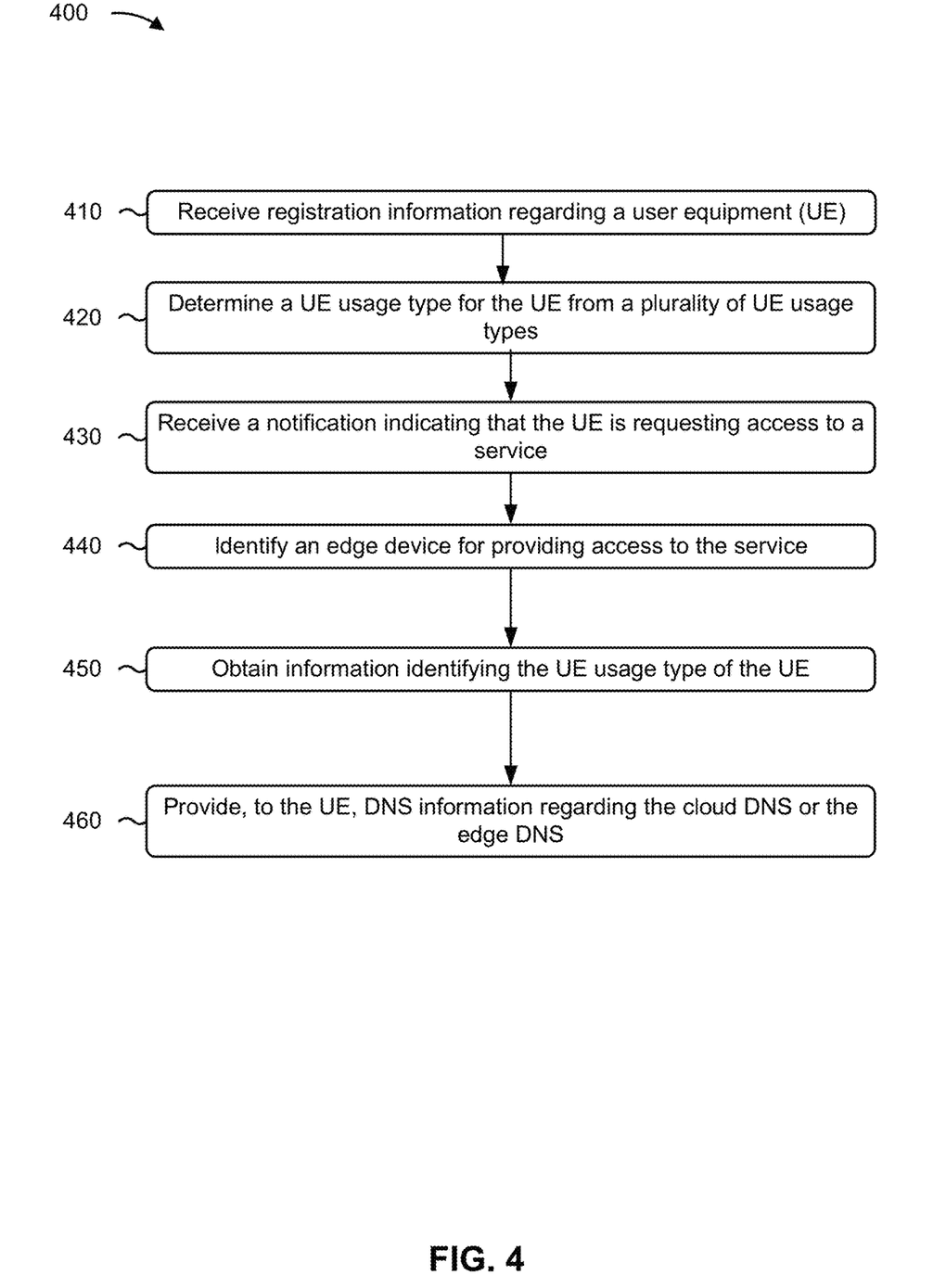
FIG. 4 is a flowchart of an example process relating to edge device discovery.

FIG. 4 is a flowchart of an example process 400 relating to edge device discovery. In some implementations, one or more process blocks of FIG. 4 may be performed by a system (e.g., far cloud component 110 and/or MME component 125). In some implementations, one or more process blocks of FIG. 4 may be performed by another device or a group of devices separate from or including the system, such as UE (e.g., UE 105), an EDS component (e.g., EDS component 115), and/or an SDM component (e.g., SDM component 120). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving registration information regarding a UE (block 410). In some implementations, the registration information identifies a subscription of services associated with the UE. The registration information indicates whether the services are to be accessed using a device in an edge network or using a device in a far cloud network. The UE usage type may be determined based on whether the services are to be accessed using a device in the edge network or using a device in the far cloud network.

As further shown in FIG. 4, process 400 may include determining a UE usage type for the UE from a plurality of UE usage types (block 420). The plurality of UE usage types includes a first UE usage type associated with accessing first services using a cloud DNS and a second UE usage type associated with accessing second services using an edge DNS, as described above.

In some implementations, the UE usage type is determined based on the registration information. In some implementations, the plurality of UE usage types includes a first UE usage type associated with accessing first services using a cloud DNS and a second UE usage type associated with accessing second services using an edge DNS. As an example, the UE usage type may be an identifier and the plurality of UE usage types may be a plurality of identifiers.

In some implementations, the system may receive, from the UE, a request to connect to a network and may determine the UE usage type of the UE based on the request to connect to the network.

As further shown in FIG. 4, process 400 may include receiving a notification indicating that the UE is requesting access to a service (block 430). For example, the system may receive, (from the UE) a request to connect to a network and determine the identifier of the UE based on the request to connect to the network. The system may provide the notification based on receiving the request.

As further shown in FIG. 4, process 400 may include identifying an edge device for providing access to the service (block 440). The edge device may be an MEC device.

In some implementations, identifying the edge device comprises determining a network address assigned to the UE. The network address assigned to the UE is determined independently of querying the UE for the network address assigned to the UE, and identifying the edge device based on the network address assigned to the UE.

As further shown in FIG. 4, process 400 may include obtaining information identifying the UE usage type of the UE based on UE identification information of the UE (block 450). The UE identification information is associated with the notification, as described above.

As further shown in FIG. 4, process 400 may include providing, to the UE, DNS information regarding the cloud DNS or the edge DNS (block 460). The DNS information indicates that the UE is to: use the cloud DNS to obtain a network address of the edge device based on the obtained UE usage type being the first UE usage type, as described above. In some implementations, the DNS information indicates that the UE is to: use the cloud DNS to obtain a network address of the edge device based on the obtained UE usage type being the first UE usage type.

In some implementations, the plurality of UE usage types further includes a third UE usage type associated with accessing services using the cloud DNS or using the edge DNS.

In some implementations, process 400 includes determining that the UE is authorized to access a plurality of services including the service, and providing information regarding the plurality of services to the edge device.

In some implementations, process 400 includes storing, in a data structure, the UE identification information in association with at least one of information identifying the UE usage type or the DNS information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving registration information regarding a user equipment (UE),
      wherein the registration information identifies a measure of latency associated with services that the UE is authorized to access;
   determining a UE usage type for the UE, from a plurality of UE usage types, based on the registration information,
      wherein the plurality of UE usage types includes a first UE usage type associated with accessing first services using a cloud domain name system (DNS) and a second UE usage type associated with accessing second services using an edge DNS, and
      wherein the UE usage type indicates that the UE is to use the cloud DNS to access the first services or use the edge DNS to access the second services;
   receiving a notification indicating that the UE is requesting access to a service;
   identifying an edge device for providing access to the service;
   obtaining information identifying the UE usage type of the UE based on UE identification information of the UE,
      wherein the UE identification information is associated with the notification, and
      wherein the information identifying the UE usage type is based on the measure of latency; and
   providing, to the UE, DNS information regarding the cloud DNS or the edge DNS,
      wherein the DNS information indicates that the UE is to:
         use the cloud DNS to obtain a network address of the edge device based on the obtained UE usage type being the first UE usage type, or
         use the edge DNS to obtain the network address based on the obtained UE usage type being the second UE usage type.

2. The method of claim 1, wherein the network address of the edge device is a first network address, and
   wherein identifying the edge device comprises:
      determining a second network address assigned to the UE,
         wherein the second network address is determined independently of querying the UE for the second network address assigned to the UE, and
         wherein a location of the UE is determined based on the second network address; and
      identifying the edge device based on the location determined based on the second network address.

3. The method of claim 1, wherein determining the UE usage type of the UE comprises:
   receiving, from the UE, a request to connect to a network; and
   determining the UE usage type of the UE based on the request to connect to the network.

4. The method of claim 1, wherein the plurality of UE usage types further includes:
   a third UE usage type associated with accessing services using the cloud DNS or using the edge DNS.

5. The method of claim 1, wherein the registration information identifies a subscription of services associated with the UE,
wherein the registration information indicates whether the services are to be accessed using a device in an edge network or using a device in a far cloud network, and
wherein the UE usage type is determined based on whether the services are to be accessed using a device in the edge network or using a device in the far cloud network.

6. The method of claim 1, further comprising:
determining that the UE is authorized to access a plurality of services including the service; and
providing information regarding the plurality of services to the edge device.

7. The method of claim 1, further comprising:
storing, in a data structure, the UE identification information in association with at least one of the information identifying the UE usage type or the DNS information.

8. A system, comprising:
one or more processors configured to:
receive registration information regarding a user equipment (UE),
wherein the registration information identifies a measure of latency associated with services that the UE is authorized to access;
determine an identifier for the UE from a plurality of identifiers,
wherein the identifier is determined based on the measure of latency identified by the registration information, and
wherein the plurality of identifiers includes a first identifier associated with accessing first services using a cloud domain name system (DNS) and a second identifier associated with accessing second services using an edge DNS;
receive a notification indicating that the UE is requesting access to a service;
identify a device for providing access to the service;
obtain the identifier of the UE based on UE identification information of the UE, wherein the UE identification information is associated with the notification; and
provide, to the UE, DNS information to cause the UE to obtain a network address of the device using the cloud DNS or the edge DNS,
wherein the DNS information is based on the obtained identifier.

9. The system of claim 8, wherein the device is a multi-access edge computing (MEC) device,
wherein the first identifier is determined based on a first measure of latency associated with the first services,
wherein the second identifier is determined based on a second measure of latency associated with the second services, and
wherein the first measure of latency exceeds the second measure of latency.

10. The system of claim 8, wherein the DNS information indicates that the UE is to use the cloud DNS to obtain a network address of the device based on the identifier being the first identifier, or
wherein the DNS information indicates that the UE is to use the edge DNS to obtain the network address based on the identifier being the second identifier.

11. The system of claim 8, wherein the one or more processors, to identify the device, are configured to:
determine a location of the UE independently of querying the UE for the location; and
identify the device based on the location of the UE.

12. The system of claim 8, wherein the one or more processors, to determine the identifier of the UE, are configured to:
receive, from the UE, a request to connect to a network; and
determine the identifier of the UE based on the request to connect to the network.

13. The system of claim 8, wherein the plurality of identifiers further includes:
a third identifier associated with accessing services using the cloud DNS or using the edge DNS.

14. The system of claim 8, wherein the one or more processors are further configured to:
determine that the UE is authorized to access the services including the service;
provide, to the device, information regarding the services and credentials associated with the UE; and
provide a network address of the device to the edge DNS.

15. A non-transitory computer-readable medium storing a set of instructions, the set of instructions comprising:
one or more instructions that, when executed by one or more processors of a one or more devices, cause the one or more devices to:
receive registration information regarding a user equipment (UE),
wherein the registration information identifies a measure of latency associated with services that the UE is authorized to access;
determine an identifier for the UE from a plurality of identifiers,
wherein the identifier is determined based on the measure of latency identified by the registration information, and
wherein the plurality of identifiers includes a first identifier associated with accessing first services using a cloud domain name system (DNS) and a second identifier associated with accessing second services using an edge DNS;
receive a notification indicating that the UE is requesting access to a service;
identify an edge device for providing access to the service;
obtain the identifier of the UE based on UE identification information of the UE, wherein the UE identification information is associated with the notification; and
provide, to the UE, DNS information to cause the UE to obtain a network address of the edge device using the cloud DNS or the edge DNS,
wherein the DNS information is based on the obtained identifier.

16. The non-transitory computer-readable medium of claim 15, wherein the one or more instructions further cause the one or more devices to:
store, in a data structure, the UE identification information in association with at least one of information identifying the identifier or the DNS information.

17. The non-transitory computer-readable medium of claim 15, wherein the one or more instructions, that cause the one or more devices to identify the edge device, cause the one or more devices to:
determine a network address assigned to the UE independently of querying the UE for the network address assigned to the UE, wherein at least one of a location of the UE or a region of the UE is determined based on the network address assigned to the UE; and identify the edge device based on the at least one of the location or the region.

18. The non-transitory computer-readable medium of claim 15, wherein the one or more instructions, that cause the one or more devices to determine the identifier of the UE, cause the one or more devices to:

receive, from the UE, a request to connect to a network; and determine the identifier of the UE based on the request to connect to the network.

19. The non-transitory computer-readable medium of claim 15, wherein plurality of UE usage types further includes:

a third UE usage type associated with accessing services using the cloud DNS or using the edge DNS.

20. The non-transitory computer-readable medium of claim 15, wherein the one or more instructions further cause the one or more devices to:

determine that the UE is authorized to access a plurality of services including the service;

provide, to the edge device, information regarding the plurality of services and credentials associated with the UE; and provide a network address of the edge device to the edge DNS.

* * * * *